United States Patent
Claudatos et al.

(10) Patent No.: US 8,180,743 B2
(45) Date of Patent: May 15, 2012

(54) INFORMATION MANAGEMENT

(75) Inventors: Christopher Hercules Claudatos, San Jose, CA (US); William Dale Andruss, Minneapolis, MN (US); Richard Urmston, Westborough, MA (US); Mark Rambacher, Littleton, MA (US)

(73) Assignee: EMC Corporation, Hopkinton, MA (US)

(*) Notice: Subject to any disclaimer, the term of this patent is extended or adjusted under 35 U.S.C. 154(b) by 737 days.

(21) Appl. No.: 11/028,080

(22) Filed: Dec. 31, 2004

(65) Prior Publication Data

US 2006/0004819 A1    Jan. 5, 2006

(51) Int. Cl.
G06F 7/00 (2006.01)
G06F 17/00 (2006.01)
G06F 17/30 (2006.01)

(52) U.S. Cl. .......................... 707/694; 707/737
(58) Field of Classification Search .................. 702/190; 707/100, 102, 200, 204; 709/201
See application file for complete search history.

(56) References Cited

U.S. PATENT DOCUMENTS

| | | |
|---|---|---|
| 4,831,438 A | 5/1989 | Bellman et al. |
| 5,027,104 A | 6/1991 | Reid |
| 5,053,868 A | 10/1991 | Higgins et al. |
| 5,086,385 A | 2/1992 | Launey et al. |
| 5,454,037 A | 9/1995 | Pacella |
| 5,758,079 A | 5/1998 | Ludwig et al. |
| 5,793,419 A | 8/1998 | Fraley |
| 5,867,494 A | 2/1999 | Krishnaswamy et al. |
| 5,905,988 A | 5/1999 | Schwartz et al. |
| 5,946,050 A | 8/1999 | Wolff |
| 5,987,454 A | 11/1999 | Hobbs |
| 6,064,963 A | 5/2000 | Gainsboro |
| 6,064,964 A | 5/2000 | Yamamoto et al. |
| 6,067,095 A | 5/2000 | Danieli |
| 6,115,455 A | 9/2000 | Picard |
| 6,137,864 A | 10/2000 | Yaker |
| 6,192,111 B1 | 2/2001 | Wu |
| 6,192,342 B1 | 2/2001 | Akst |
| 6,233,313 B1 | 5/2001 | Farris et al. |
| 6,243,676 B1 | 6/2001 | Witteman |
| 6,246,933 B1 | 6/2001 | Bague |
| 6,278,772 B1 | 8/2001 | Bowater et al. |
| 6,278,992 B1 | 8/2001 | Curtis et al. |
| 6,289,382 B1 | 9/2001 | Bowman-Amuah |
| 6,311,159 B1 | 10/2001 | Van Tichelen et al. |
| 6,327,343 B1 | 12/2001 | Epstein et al. |
| 6,345,252 B1 | 2/2002 | Beigi et al. |
| 6,377,663 B1 | 4/2002 | Thurber |
| 6,404,856 B1 | 6/2002 | Wilcox et al. |
| 6,438,594 B1 | 8/2002 | Bowman-Amuah |
| 6,522,727 B1 | 2/2003 | Jones |
| 6,539,077 B1 | 3/2003 | Ranalli et al. |
| 6,539,354 B1 | 3/2003 | Sutton et al. |

(Continued)

*Primary Examiner* — Ann Chempakaseril
(74) *Attorney, Agent, or Firm* — Theodore A. Chen; Krishnendu Gupta

(57) ABSTRACT

A method, article of manufacture, and apparatus for managing an object are disclosed. In an embodiment, this comprises managing an object having content, in a system having a dynamic policy selector configured with at least one analytic policy applied to evaluate the content of the object. The object is associated to an information management policy. Classification levels may be used, in which classification levels are associated to information management policies and objects are associated with classification levels. Objects containing certain elements or related elements may be associated to form an information group, to which information management policies may be applied as a group. Storage pools may be used for managing objects with similar classification levels or information protection policies.

9 Claims, 12 Drawing Sheets

U.S. PATENT DOCUMENTS

| | | |
|---|---|---|
| 6,542,500 B1 | 4/2003 | Gerszberg et al. |
| 6,542,602 B1 | 4/2003 | Elazar |
| 6,549,949 B1 | 4/2003 | Bowman-Amuah |
| 6,577,333 B2 | 6/2003 | Tai et al. |
| 6,633,835 B1 * | 10/2003 | Moran et al. ............ 702/190 |
| 6,661,879 B1 | 12/2003 | Schwartz et al. |
| 6,662,178 B2 | 12/2003 | Lee |
| 6,665,376 B1 | 12/2003 | Brown |
| 6,697,796 B2 | 2/2004 | Kermani |
| 6,721,706 B1 | 4/2004 | Strubbe et al. |
| 6,728,679 B1 | 4/2004 | Strubbe et al. |
| 6,731,307 B1 | 5/2004 | Strubbe et al. |
| 6,732,090 B2 | 5/2004 | Shanahan et al. |
| 6,732,109 B2 | 5/2004 | Lindberg et al. |
| 6,748,360 B2 | 6/2004 | Pitman et al. |
| 6,772,125 B2 | 8/2004 | Harradine et al. |
| 6,781,962 B1 | 8/2004 | Williams et al. |
| 6,784,899 B1 | 8/2004 | Barrus et al. |
| 6,785,370 B2 | 8/2004 | Glowny et al. |
| 6,795,808 B1 | 9/2004 | Strubbe et al. |
| 6,807,574 B1 | 10/2004 | Partovi et al. |
| 6,816,085 B1 | 11/2004 | Haynes et al. |
| 6,820,075 B2 | 11/2004 | Shanahan et al. |
| 6,862,566 B2 | 3/2005 | Wakita et al. |
| 6,889,232 B2 | 5/2005 | Pudipeddi et al. |
| 6,930,599 B2 | 8/2005 | Naidoo et al. |
| 6,934,756 B2 | 8/2005 | Maes |
| 6,937,986 B2 | 8/2005 | Denenberg et al. |
| 6,961,763 B1 | 11/2005 | Wang et al. |
| 6,961,954 B1 | 11/2005 | Maybury et al. |
| 6,968,364 B1 | 11/2005 | Wong et al. |
| 7,007,048 B1 * | 2/2006 | Murray et al. ............ 707/204 |
| 7,027,565 B2 | 4/2006 | Tateishi et al. |
| 7,039,585 B2 | 5/2006 | Wilmot et al. |
| 7,058,565 B2 | 6/2006 | Gusler et al. |
| 7,069,291 B2 | 6/2006 | Graves et al. |
| 7,117,158 B2 | 10/2006 | Weldon et al. |
| 7,133,511 B2 | 11/2006 | Buntin et al. |
| 7,177,800 B2 | 2/2007 | Wallers |
| 7,191,133 B1 | 3/2007 | Pettay |
| 7,260,190 B2 | 8/2007 | Fellenstein et al. |
| 7,302,394 B1 | 11/2007 | Baray et al. |
| 7,356,474 B2 | 4/2008 | Kumhyr |
| 7,440,558 B2 | 10/2008 | Heilmann et al. |
| 7,444,287 B2 | 10/2008 | Claudatos et al. |
| 7,457,396 B2 | 11/2008 | Claudatos et al. |
| 7,499,531 B2 | 3/2009 | Claudatos et al. |
| 2001/0036821 A1 | 11/2001 | Gainsboro et al. |
| 2001/0038624 A1 | 11/2001 | Greenberg et al. |
| 2001/0055372 A1 | 12/2001 | Glowny et al. |
| 2002/0002460 A1 | 1/2002 | Pertrushin |
| 2002/0032564 A1 | 3/2002 | Ehsani et al. |
| 2002/0105598 A1 | 8/2002 | Tai et al. |
| 2002/0107694 A1 | 8/2002 | Lerg |
| 2002/0110264 A1 | 8/2002 | Sharoni et al. |
| 2002/0122113 A1 | 9/2002 | Foote |
| 2002/0143797 A1 * | 10/2002 | Zhang et al. ............ 707/200 |
| 2002/0168058 A1 | 11/2002 | Gailbraith |
| 2003/0018531 A1 | 1/2003 | Mahaffy et al. |
| 2003/0033287 A1 | 2/2003 | Shanahan et al. |
| 2003/0033294 A1 | 2/2003 | Walker et al. |
| 2003/0058277 A1 | 3/2003 | Bowman-Amuah |
| 2003/0074404 A1 | 4/2003 | Parker et al. |
| 2003/0078973 A1 | 4/2003 | Przekop et al. |
| 2003/0088573 A1 | 5/2003 | Stickler |
| 2003/0093260 A1 | 5/2003 | Dagtas et al. |
| 2003/0097365 A1 | 5/2003 | Stickler |
| 2003/0112259 A1 | 6/2003 | Kinjo |
| 2003/0120390 A1 | 6/2003 | Hopkins |
| 2003/0158839 A1 | 8/2003 | Faybishenko et al. |
| 2003/0182308 A1 | 9/2003 | Ernst et al. |
| 2003/0182387 A1 | 9/2003 | Geshwind |
| 2003/0191911 A1 | 10/2003 | Kleinschnitz et al. |
| 2003/0193994 A1 | 10/2003 | Stickler |
| 2003/0225801 A1 | 12/2003 | Devarakonda et al. |
| 2003/0227540 A1 | 12/2003 | Monroe |
| 2003/0236788 A1 * | 12/2003 | Kanellos et al. ............ 707/100 |
| 2004/0002868 A1 | 1/2004 | Geppert et al. |
| 2004/0003132 A1 | 1/2004 | Stanley et al. |
| 2004/0006506 A1 | 1/2004 | Hoang |
| 2004/0008828 A1 | 1/2004 | Coles et al. |
| 2004/0010415 A1 | 1/2004 | Seo et al. |
| 2004/0010519 A1 | 1/2004 | Sinn et al. |
| 2004/0024762 A1 | 2/2004 | Agarwal et al. |
| 2004/0030741 A1 | 2/2004 | Wolton et al. |
| 2004/0054531 A1 | 3/2004 | Asano |
| 2004/0083101 A1 | 4/2004 | Brown et al. |
| 2004/0083244 A1 | 4/2004 | Muecklich et al. |
| 2004/0085203 A1 | 5/2004 | Junqua |
| 2004/0111639 A1 | 6/2004 | Schwartz et al. |
| 2004/0127286 A1 | 7/2004 | Fujimoto |
| 2004/0143602 A1 | 7/2004 | Ruiz et al. |
| 2004/0167890 A1 | 8/2004 | Eyal |
| 2004/0186726 A1 | 9/2004 | Grosvenor |
| 2004/0199494 A1 | 10/2004 | Bhatt |
| 2004/0199566 A1 * | 10/2004 | Carlson et al. ............ 709/201 |
| 2004/0203577 A1 | 10/2004 | Forman et al. |
| 2004/0221261 A1 | 11/2004 | Blevins |
| 2004/0235520 A1 | 11/2004 | Cadiz et al. |
| 2004/0247086 A1 | 12/2004 | Menard et al. |
| 2004/0249790 A1 | 12/2004 | Komamura |
| 2004/0263636 A1 | 12/2004 | Cutler et al. |
| 2005/0015286 A1 | 1/2005 | Rudnik et al. |
| 2005/0069095 A1 | 3/2005 | Fellenstein et al. |
| 2005/0131559 A1 | 6/2005 | Kahn et al. |
| 2006/0010150 A1 * | 1/2006 | Shaath et al. ............ 707/102 |
| 2006/0095502 A1 | 5/2006 | Lewis et al. |

* cited by examiner

INFORMATION MANAGEMENT

CROSS REFERENCE TO RELATED APPLICATIONS

This application claims priority to co-pending U.S. patent application Ser. No. 10/884,345 for METHOD AND SYSTEM FOR INFORMATION LIFECYCLE MANAGEMENT, filed Jul. 1, 2004, which is incorporated herein by reference for all purposes; and to co-pending U.S. patent application Ser. No. 11/001,201 for CONTENT-DRIVEN INFORMATION LIFECYCLE MANAGEMENT, filed Nov. 30, 2004, which is incorporated herein by reference for all purposes. This application is related to co-pending U.S. patent application Ser. No. 11/027,997 for POLICY-BASED INFORMATION MANAGEMENT and filed concurrently herewith, which is incorporated herein by reference for all purposes; co-pending U.S. patent application Ser. No. 11/028,079 for EFFICIENT INFORMATION MANAGEMENT and filed concurrently herewith, which is incorporated herein by reference for all purposes; and co-pending U.S. patent application Ser. No. 11/028,089 for STORAGE POOLS FOR INFORMATION MANAGEMENT and filed concurrently herewith, which is incorporated herein by reference for all purposes.

FIELD OF THE INVENTION

This invention relates generally to storage management. More particularly, information management is described.

BACKGROUND

Businesses and other enterprises generate large amounts of information, which must be stored in a cost-effective manner while ensuring acceptable levels of availability, security, and accessibility. Different types of data have different storage requirements. Stored information is currently managed through a set of manual, automatic, or semi-automatic policies, procedures, and practices. These methods are applied in a variety of ways to a variety of data and data storage systems. For example, the methods can be applied to a specific volume, storage array, object, file, folder, database, or file/data types. When an ILM (Information Lifecycle Management) managed system sets the retention period, storage prioritization, deletion date, etc. of a specific file or object, it typically does so based on one or more criteria, such as date of the file's creation, type of file, location of the file, date of the file's last use, etc.

However, such criteria are generally quite coarse and fail to give enough information to accurately characterize the proper treatment of the file or object. Thus, the ability of a system to automatically or autonomously determine ILM settings for specific data is limited. As a result, some files or objects are not handled efficiently or in the desired manner. For example, some files may be discarded or moved to off-line storage when it is desirable to retain them, while other files are retained when it is desirable to discard them or move them to off-line storage.

There is a need, therefore, for an improved method, article of manufacture, and apparatus for managing the lifecycle of files and other objects in a storage system.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE INVENTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. A general purpose computer system such as an Intel-based processor running Microsoft Windows or Linux may be used, or a specialized appliance could be used. In this specification, these implementations, or any other form that the invention may take, may be referred to as techniques. In general, the order of the steps of disclosed processes may be altered within the scope of the invention.

An embodiment of the invention will be described with reference to an information management system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
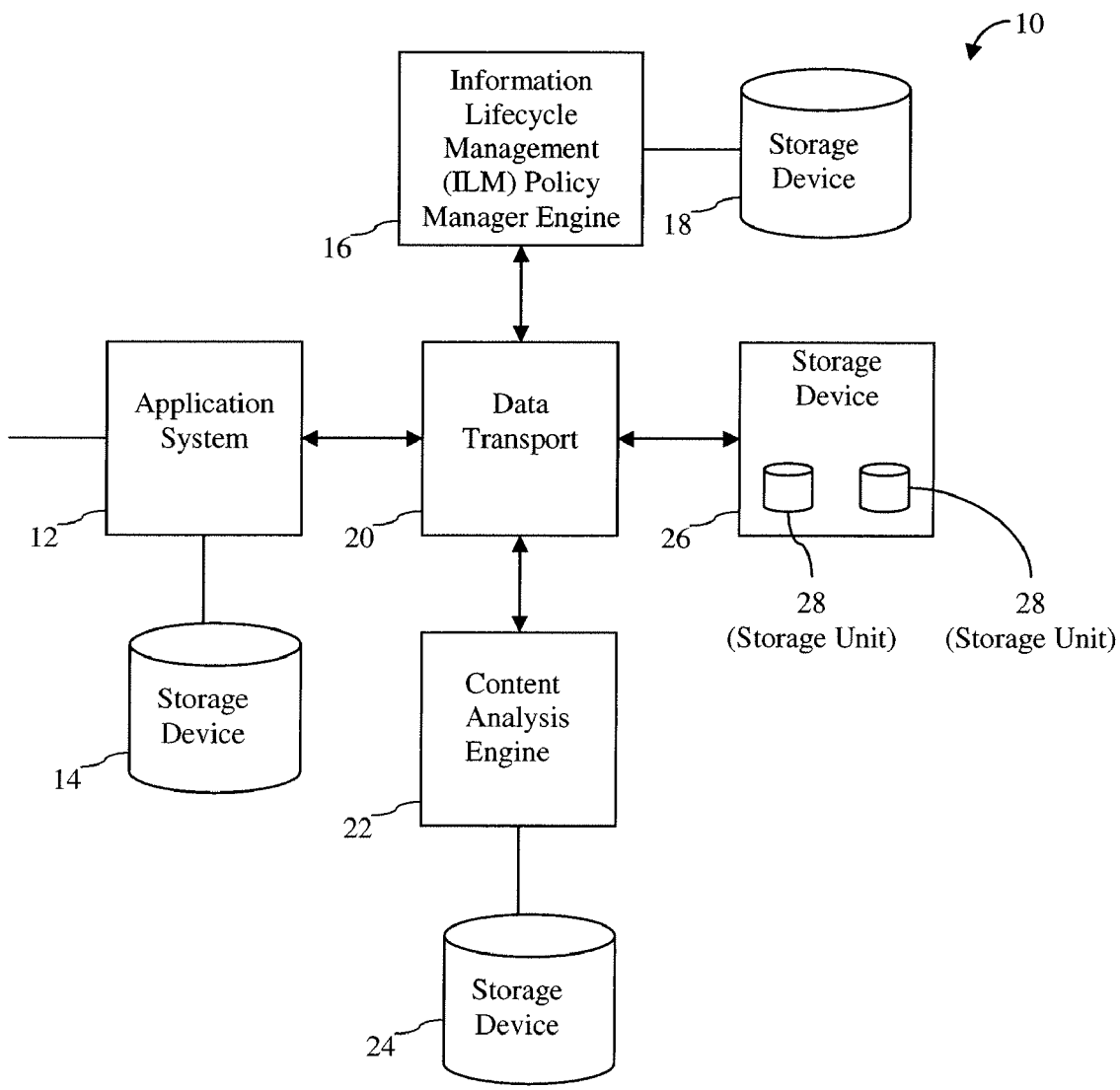
FIG. 1 is a diagram of an information management system.

Disclosed herein are a method and system to manage the information lifecycle of an object in a storage system. In particular, the foregoing will be described with respect to FIG. 1. An information management system 10 comprises a storage system 26 including storage units 28 in the form of disk drives, content analysis engine 22, information lifecycle management (ILM) policy manager engine 16, an application system 12, and a data transport 20. As shown by various storage devices 14, 18, and 24, any of the foregoing systems may include storage, such as for metadata or metadata index repository. It should be understood that although an embodiment is being described as being used with disk drives, any type of storage may be used, such as disk drives, content addressable storage, flash memory, tape drives, optical drives, CD-Recordable drives, DVD-Recordable drives, non-volatile storage, etc.

Figure 2:
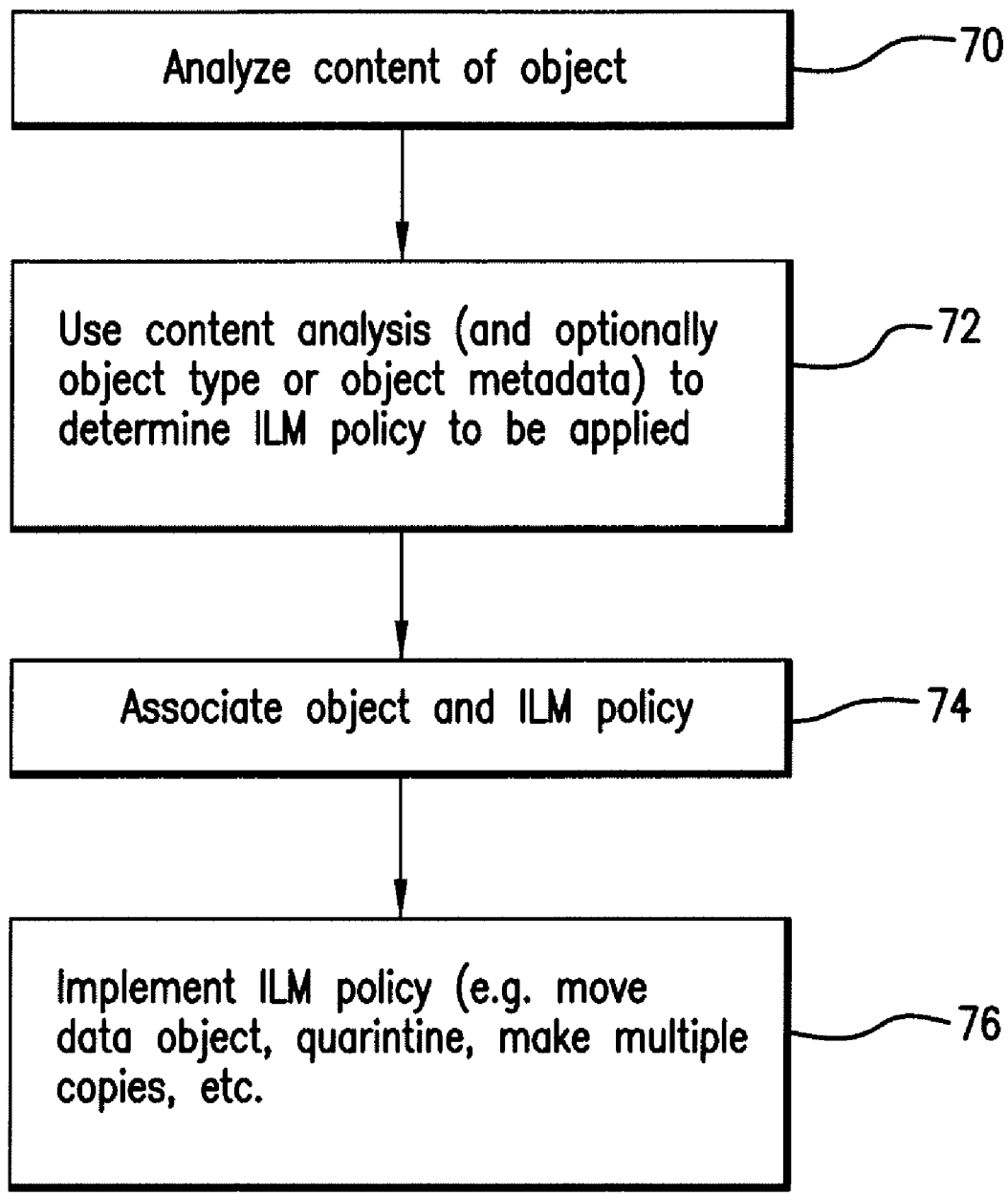
FIG. 2 is a flowchart illustrating information management using content analysis to set policies.

The method, illustrated in FIG. 2, comprises analyzing the content of the object in step 70, and based on the content analysis, determining the ILM (or simply IM, for "information management") policy or policies to be applied to the object, step 72. The type of the object (which may be determined from metadata associated with the object) and/or the metadata may be used in determining the ILM policy to be applied. The ILM policy is associated with the object, step 74, and in step 76, the ILM policy is implemented for that object (which may involve moving the object, quarantining the object, making multiple copies, scheduling backups, etc.).

One approach to managing the information lifecycle of a stored file is to set a number of ILM policies, and apply those policies to files that meet the criteria for applying the policies. ILM policies may include quarantine of particular subject matter (such as prohibited material or material relevant to an ongoing investigation) for further review or limited access, workflow management (such as file content which requires multiple actions to be taken upon it such as a review for HR compliance, approval for release from a Quarantine, editing prior to release, etc. by multiple parties either simultaneously or in parallel), service level (such as bandwidth, performance, latency, etc.), security (such as encryption, level of encryption, access control), information protection level (such as frequency of backup, redundancy of data), availability (such as failover, standby server, etc.), archive, physical location, provisioning (such as adding or configuring storage), and so on.

For example, the date of last use of the data is sometimes used to determine a file's relative importance. Data can be moved to a secondary storage location, to offline storage, or even deleted depending on the date of last use. However, this method may be too coarse because it does not take into account other factors besides the date of last use. Certain accounting files may not be used for a quarter but then are needed at the end of the period for specific reporting purposes. Other files may be used in six month intervals or yearly. When they are used, they need to be immediately available and have a high level of service associated with them, perhaps at least equal to their original service level.

Other information may be used in order to characterize the data, such as the file's owner, date of creation, file type, file size, and so on. These are useful in better characterizing the data but alone do not provide sufficient information in order to create automatic or autonomous ILM systems. For example, knowing that the owner of a file is in the accounting department and that the file is an Excel spreadsheet could be used to make service level decisions or determine whether the file should be deleted at a particular time. However, the system cannot determine from this information whether the file is an important revenue-tracking spreadsheet used as a basis for financial statements subject to regulatory compliance procedures (which might be subject to Sarbanes-Oxley and SEC retention requirements), or a spreadsheet used to keep track of people who will be attending a holiday party (which is of minimal importance and can be deleted soon). Outside of the specific content of data, there are few characteristics about the data that can be used to correctly set an appropriate ILM policy.

A factor that must be considered is the requirement to retain data in response to corporate, industry, and governmental laws and regulations. This makes it more critical to accurately characterize the ILM policies that need to be applied to the data, and because of the legal implications, there is a tendency to be over-inclusive. As has been illustrated, knowing the particular owner of a file, its type, date of creation, and date of last use may not be sufficient to make a useful decision with regard to compliance retention or disposal. The result is needless retention of large amounts of data, which also becomes problematic when there is a need to quickly locate and retrieve relevant data.

The content of the data gives a better indication of how the data should be handled from an ILM standpoint. Through the analysis of the data content, more information can be derived and ILM policies can be appropriately created and applied. For example, quarterly and yearly reports may be identified by keywords/phrases within the documents which indicate that they are quarterly/yearly reports. Additional analysis can reveal what type of report, the reporting period, author, etc. This information may be combined with file metadata such as the file's owner, date of creation, and file type to set an appropriate and meaningful ILM policy.

Content can also be used to determine the appropriate retention/deletion policy. For example, if an object contains certain keywords/phrases relating to a patient's diagnosis and/or contains personal health information, then the object may need to be retained as long as the patient's medical records. On the other hand, if the object does not contain such content, it may be found not to require long term retention, and an appropriate ILM policy can be set, such as deletion in a short time period. By evaluating the object's content directly, the correct retention period may be programmatically determined with more accuracy.

The type of data contained by an object may be determined from metadata accompanying the object, which could comprise information provided by the application that created the object, information from the user who created the object, and/or filesystem information. Pattern matching to known file patterns may also be used to determine the file type. The information about the type of data contained by the object can be used to analyze its contents, thereby deriving information to set an appropriate ILM policy.

For example, simply knowing or determining that a file is a video file is useful but not as meaningful in terms of determining the appropriate ILM policy. Knowing who or what is depicted in the video, and other relevant information regarding the subject matter and/or content of the video itself, provides meaningful data that can be used in combination with file metadata to set an appropriate ILM policy.

Content evaluation may be performed on various file types, such as video, audio, graphics (e.g. bitmaps), text, and encrypted data. Content analysis on a video file (or any file that contains video) would involve evaluation of the video images themselves to determine who, where, and what images are depicted. Based on this information, which is derived from the analysis done on the video images, ILM policies are set. An audio file or the audio portion of a file or data set may be analyzed to determine the identity of the speaker and what was said. In addition to analysis of speech data, other forms of audio analysis can be used, such as determining if the audio is music and what type of music. Other sounds include sounds associated with events and places such as explosions, glass breaking, gun shots, screams, automobile traffic, boat/ship/airplane sounds, cash registers opening/closing/tallying, etc.

Graphics and bitmaps like video images, graphic files, and graphic data sets can be evaluated for their content such as who and what are depicted as well as where and how. Text and other forms of document rendition can be analyzed for the presence or absence of certain keywords and phrases. In evaluating data, it can be determined whether the data is encrypted. In cases of encrypted data, different policies could be applied to data encrypted by the host system and files encrypted by unknown systems. For example, data that is encrypted by known host systems may be sent through the host system's decryption system and have its content decrypted so that it can be inspected and evaluated against company policies, legal regulations, etc. Because the content of these files is readable by the host system, appropriate ILM polices can be applied to the files. In the case of data that is encrypted by unknown systems or encrypted in a manner which the host system cannot decrypt, its content is unknown to the host system and the host system has no way to automatically or programmatically decrypt the data to inspect its unencrypted content. Because of this companies may not wish to accept data or files whose meaning and content are not readily known. Companies may also choose to keep files whose decryption keys are unknown to them for purposes of authentication, validation, and non-repudiation of other files. These files serve as digital signatures and can provide cryptographic proof of the validity and authenticity of a file as well provide a timestamp to indicate that the file existed at a specific point in time.

In an embodiment, the data may be in the form of an audio object or comprise an audio portion in an object. An auditory processing system (either integrated into the information management system or separate from it) could be used to identify words and/or sounds, using a lexicon and searching for matches. In an embodiment, the auditory processing system could compare the content to a list of elements specified in a lexicon that comprises a group of data elements consisting of auditory elements or representations of audio elements (keywords) associated to text or other data elements. Upon detection of content that matches lexicon content, metadata may be generated and associated with the content. Such metadata may be the text equivalent of the auditory content or it may be a pointer to other data held within the lexicon. The search for keywords and sound matches could specify:

The order of the appearance/sequence (e.g., "Buy" followed by "Stock")
Specific inter-keyword distance ("Buy" followed by "Stock" as the next word)
The number of repetitions within a timeframe or communication session
The inverse of the above:
  Keywords are present but not in the specific sequence
  Keywords are present but not within the inter-keyword distance
  Keywords are present but not repeated within specification The absence of the keyword(s); i.e. a non-match or negative match
Groups of keywords The information management system can be configured to retain audio objects until a specified disposition date, which may be determined by keywords identified in the audio object or policies invoked by the audio object. For example, after the system receives the audio object, it might retain the audio object for 90 days, but if the audio object contains certain triggering keywords or sounds, or triggers certain policies, the audio object might be retained for seven years.

Metadata relating to the audio object may also be used by the system to determine the disposition and disposition date. If an audio object were determined to be a recording of a phone call (such as by examining the metadata) involving a corporate insider, and words such as "buy stock" were detected in the recording, the audio object might be given a longer retention period. In an embodiment, the detection of keywords and triggering of corporate policies could be determined by an auditory processing system, which would provide an audio object with metadata indicating keywords detected and policies triggered. The metadata may be used to select appropriate ILM policies. These tasks may be performed by either the information management system or auditory processing system.

The disposition(s) and disposition date(s) may be stored with the audio object or separately from the audio object. Upon reaching the disposition date (or expiration date), the stored audio object and associated metadata may be partially or completely destroyed. Other types of processing and disposition may be invoked upon reaching the expiration date, such as hierarchical storage management functions (e.g., moving the data from disk drive media to optical or tape media), bit rate, encryption, application of digital rights management services, service level agreements, and other services associated with information lifecycle management. This processing may be performed by the information management system or other system.

Figure 4:
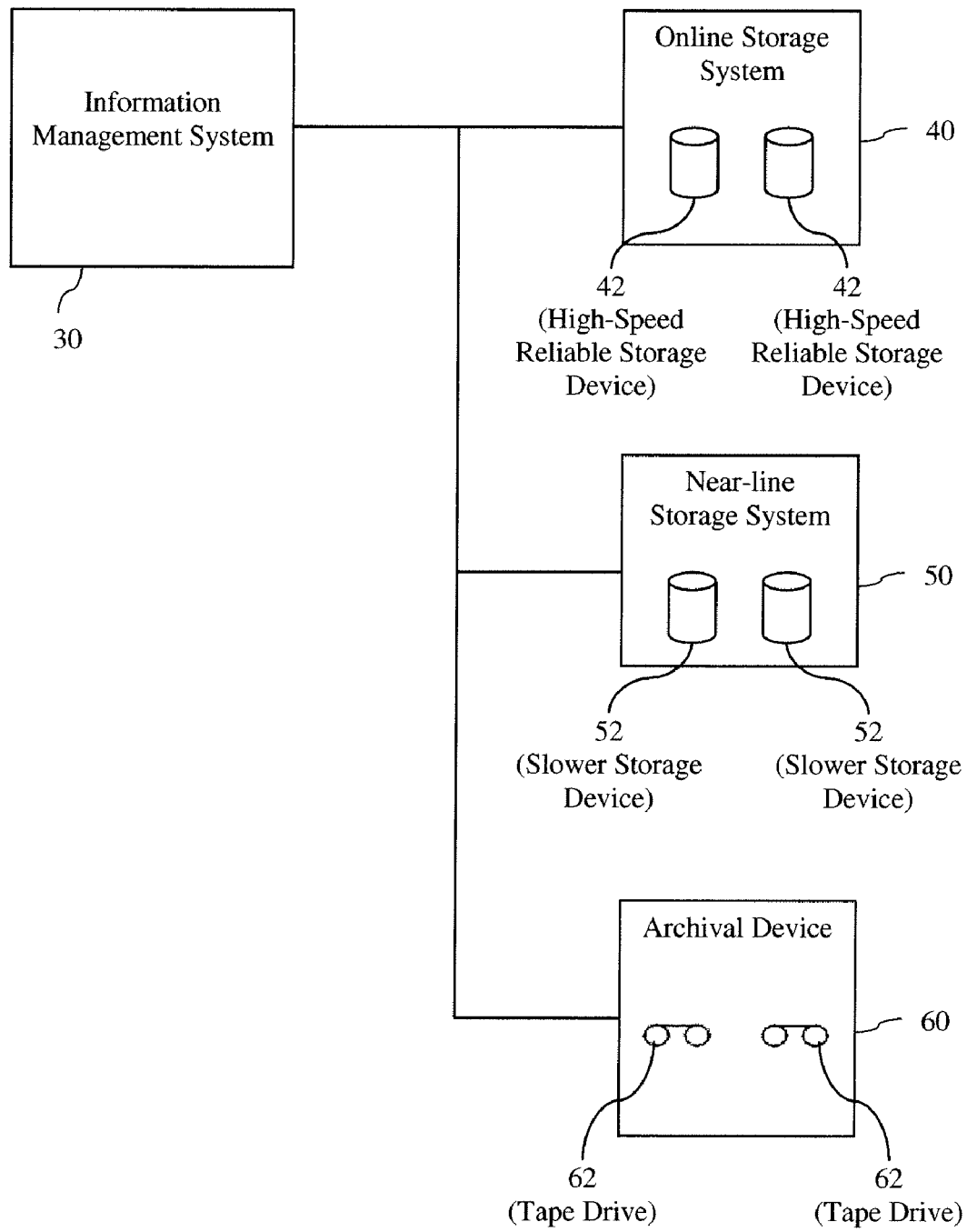
FIG. 4 is a diagram of an information management system being used with a hierarchical storage management system.

FIG. 4 illustrates a hierarchical storage management (HSM) system being used in conjunction with information management system 30. An online storage system 40 comprises high-speed, reliable storage devices 42, while a near-line storage system 50 comprises slower storage devices 52 that may have lower redundancy and reliability, but are less costly than the high-speed devices 42. An archival device 60 may comprise tape drives 62, magneto-optical drives (not shown), optical drives (not shown), or other devices suitable for long-term storage of data. Depending on a service level assigned to an object and other factors such as recent usage, it may be located on online storage 40, near-line storage 42, or archive device 60. Parts of the object may be located on different devices at different levels in the HSM system.

Metadata may be generated to describe the object's content. The metadata may be transient data that is derived each time an evaluation is required, or may be fixed data that, once derived, remains in some form storage for repeated use without requiring further analysis of the content. The metadata may be generated in several ways, which may be used together. Metadata may be associated with an object, stored with the object or separately from the object and referenced by an index, hash, address, link, etc. The metadata may comprise file metadata (e.g. file type, user/creator, data, size, last used, creation date, application), transport metadata, and storage metadata.

Figure 3:
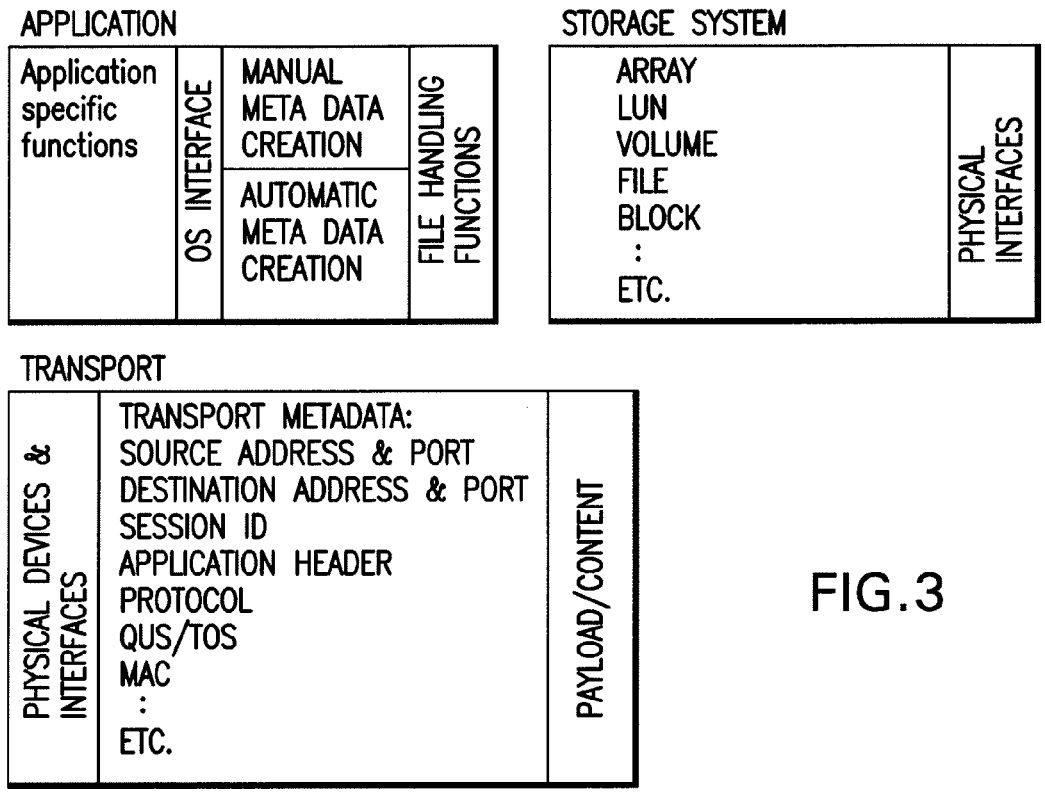
FIG. 3 illustrates several layers through which data may pass.

FIG. 3 illustrates several layers through which data might pass: an application layer, a transport layer, and a storage layer. Each of these layers provides an opportunity for the information management system 10 to derive metadata.

In an embodiment, metadata may be generated at the application layer. In this case, data about the content (metadata) is created through the application that uses and/or creates the content itself. The creation of the metadata can be done manually, by the user, or automatically through various programmatic methods, or some combination of manual and automatic methods. For example, a video editing application typically enables users to create, edit, modify/alter, or otherwise manipulate video files (which typically also contain an embedded audio portion). In an embodiment, the video editing application may be configured to accommodate metadata about the video and audio content. In this case as an example, the following information could be captured as metadata of the underlying video file:

Time and Date Data
Time/date of original creation
Time/date of each editing session (whether or not the video was edited)
Date and length of time spent editing per session
Time/date of last use
User Data
Original creator's name or user name
Editor's name or user name
Application and OS Data
Application name and version number per use/edit
Operating system used per use/edit
System ID (computer ID) per use/edit
File Data
File type and metrics (such as video type, size of file)
Original file name and type (if saved as a different file type or under a different name)
Content Data
Number and ID of clips used to create the entire video (and their associated file names and paths including audio)
Scene change index or locations (index into the video file to each scene change)
Audio content index (index into the video file to specific points which contain relevant audio elements such as music, voice, distinctive sounds, etc)
Transcription and/or keyword data (a textual rendition of speech and/or speech elements such as keywords, phrases, or utterances contained in the video file)
Scene descriptions (a textual description of the scenes and/or frames contained in the video file including location of the scene information, identities of the people, animals, objects, etc. included in the scenes)

This information can be captured by the application through a variety of means and through a combination of a variety of means. The information can be manually entered by an individual, programmatically derived, or some combination of these. In one embodiment, data relating to the file, OS, application, system data, date/time, etc. may be derived by the application. Content data may also be derived by the application. For example, transcriptions of audio portions containing speech may be rendered through the use of automatic speech recognition applications. Such applications provide programmatic renditions of speech into text.

Similarly, video recognition applications and other video analysis applications can also provide data that describes the content and can be used as metadata. Keyword analysis may be applied to text-based content.

In an embodiment, the user may also directly provide these descriptive data elements. A user can manually transcribe the speech portion of the video as well as scene descriptions, scene changes, etc. Information describing various aspects of the content may thus captured and made available for use in an information management system. In a medical context, a user might identify an object as being a surgical report, pathology report, x-ray of a patient's arm, or otherwise relevant to an individual's healthcare. The descriptive data elements may be freely entered, or selected from a list provided by the application.

Metadata in the above example may be incorporated into the video file itself as part of a video plus metadata file, into its own file (or files or records) separate from the video file itself, or both in the file and separately.

In an embodiment, metadata may be derived while the subject data is in transport. This is done through programmatic analysis (such as described herein) of the data while the data is being communicated from one system to another. Such analysis requires access to all of the data contained within the complete data packet. This may be accomplished in a manner similar to packet sniffing and can be performed in real-time at wire-speed (non-blocking) or at speeds that are slower than the original transmission speed. In an embodiment using this approach, a proxy may be configured to interact with the transmitter and intended recipient and control the proper flow of data.

For example, video files can be copied and/or moved from one system to another electronically via a network. Video files may also be streamed from one system to another for immediate viewing. During the transport of these files (such as for copying, moving, or streaming) analysis can be performed and metadata can be derived.

Additional transport related metadata can also be derived such as: Source Address, Destination Address, Source MAC (Media Access Control), Destination MAC, protocol used, route taken, and so on. In addition, metadata created by applications may also be discovered during transport. This information can also be used for ILM purposes. For example, an application may place a code within the packet header that acts as an application identifier (ID). Other applications create and use metadata for their own classification purposes such as a document's author, title, reviewer, and so on. This metadata can be inspected during transport and used to select an appropriate ILM policy for the data. For example, a document's author and title may be determined during the transport of a file even though the document is being copied or moved between two people's computers and neither one belongs to the document's author. If, for example, the corporate ILM policy specifies that all documents belonging to the author must be known and tracked, the system can do so because it can determine this information during transport, regardless of the source or destination of the file.

In an embodiment, metadata may be derived while the subject data resides on storage media. This is done through programmatic analysis (such as described herein) of the data while the data is held in some form of storage. For example, video files reside on hard disk drives, optical storage media such as DVDs, tape, and so on. While resident on these storage systems, these files can undergo programmatic and/or manual analysis from which metadata can be derived.

Additional storage related metadata may also be derived such as: logical unit (LUN), Volume, Folder, Path, Block, Sector, and so on.

In addition, metadata created by applications can also be discovered in stored data. This information can also be used for ILM purposes.

As described herein, a file or data set may have its content analyzed for the determination of an appropriate policy. In one embodiment, a policy may be selected and applied based on the analysis of the content of a file/data set in context to the content and/or analysis of the content of multiple files and data sets. Multiple documents/files/objects may contain information related to the same topic but have filenames, titles, subject headers, etc. that do not reflect this relationship. By examining and analyzing these objects, it is possible to group them and apply appropriate policies based on this analysis. Policies may be used to help determine which keywords merit forming an information group. For example, certain keywords or data found in certain locations might cause an information group to be formed.

For example, in a medical enterprise there may be multiple documents related to a specific patient's condition, treatment, etc. Physicians, technicians, nurses, orderlies, equipment/service installers (such as for TV, telephones, etc.) may each have management and activity reports which could reference a patient. In some cases, the report may contain references to multiple patients and a variety of topics. In these cases it cannot be determined whether the object is relevant to a patient's healthcare. By examining the content, references to specific patients can be found and their relevance to certain policies can be determined. For example, documents and files can be inspected for the presence of private patient data such as the patient's name, social security number, patient ID, diagnostic code, treatment code, name of the patient's condition(s), etc. By inspecting the files for any or specific combinations of these data elements it can be determined which ILM policy is appropriate. In an embodiment, a keyword-driven search or natural language analysis may be utilized. Thus, multiple documents/files/objects may be associated to a patient healthcare policy or other policy.

In one embodiment, the information management system may examine the content within an object to determine which, if any, other objects should be examined for relevant data. These examinations can cross multiple data types—from text documents to email to voicemail to video recordings to images and so on. For example, a text document may refer to a patient's diagnostic X-Ray and perhaps also the date and location it was taken. Based on this reference, the system could locate the video surveillance recordings taken during the referenced diagnostic session. The video recording's content could then be analyzed to determine if the video contains information relevant to the patient; e.g. is the patient present in the recording, the identity of others present, what diagnostic procedures were performed, etc. This information could be used to find the x-rays, radiologist's findings, etc.

Found documents may be analyzed in a similar manner. For example, the document might refer to a surgery and x-rays, leading to a search for x-rays and a post-operative report. The post-operative report may refer to a biopsy, which could then cause the system to search for the pathology report. The x-rays may have a link to the radiologist's report. If relevant, some or all of the objects may be associated as part of an information group of multiple files and/or documents to which specific policies are applied.

In one embodiment, an object may contain data about other objects that are related to the first object, such as in the form of links, filenames, or other resource locators. This data may be manually entered by the user, such as by embedding the data within the object, adding the data to the object's metadata, selecting from a list of objects, selecting a template of objects typically associated with the object, etc.

Figure 14:
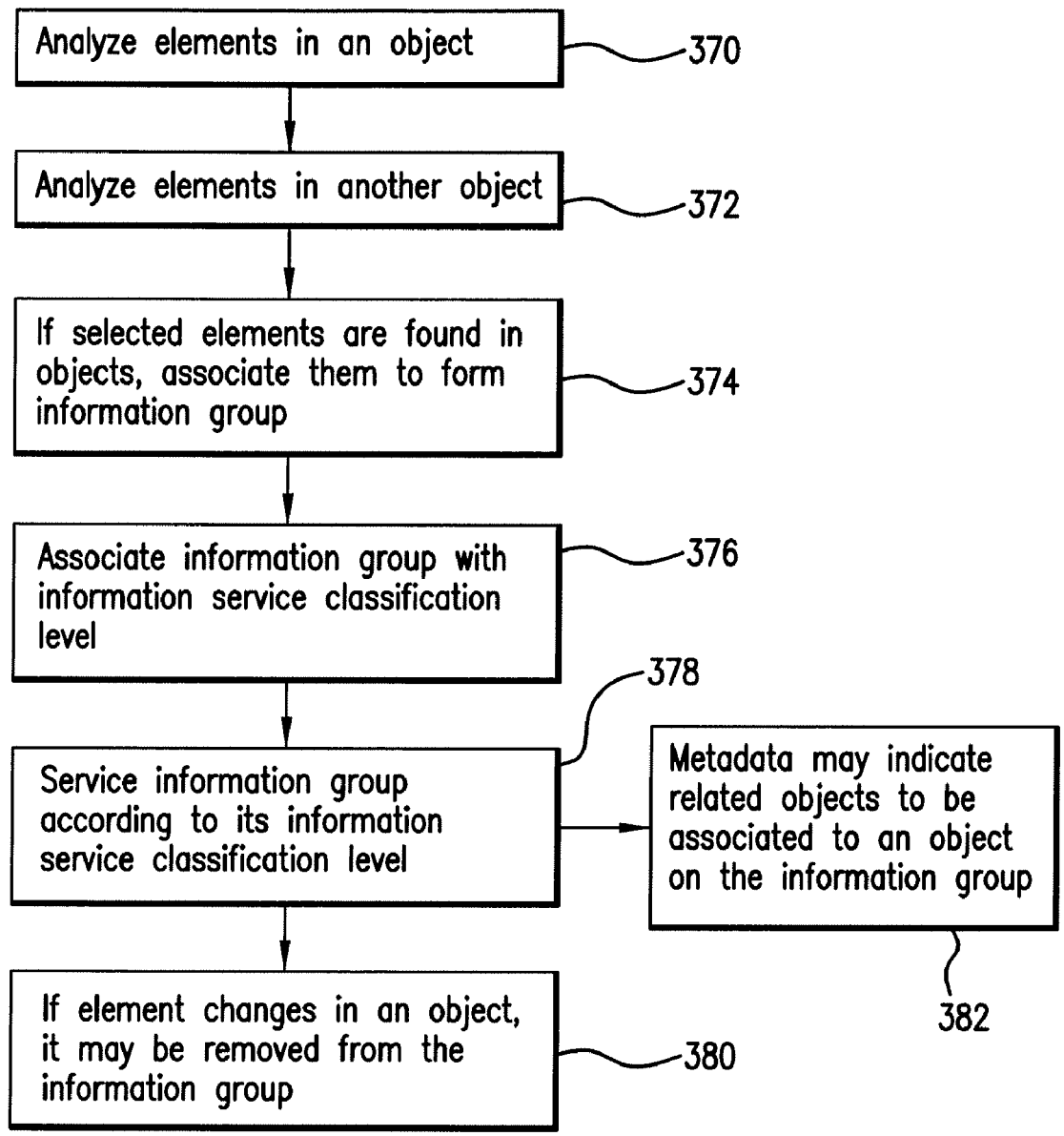
FIG. 14 is a flowchart illustrating the use of information groups.

All or some of these objects may be associated as part of an information group of multiple objects to which policies are applied, automatically or after evaluation of their content to determine relevance. An embodiment of this process is illustrated in FIG. 14. In steps 370 and 372, objects are analyzed for elements. If selected elements are found in the objects, step 374, the objects are associated to form an information group (or added to an existing information group). In an embodiment, identical elements do not have to be found in the object. For example, the exact keyword need not be found in order for the object to be selected for the information group. If a keyword is found that is related to a keyword found in the first object, the second object may be selected for the information group. The information group is associated with an information service classification level, step 376, and the information group is serviced according to its information service classification level, step 378. Metadata of an object may indicate related objects that should be associated to the object in an information group, step 382. If an element changes in an object (such as through editing), it may be removed from the information group if it no longer has an element that would merit its inclusion in the information group, step 380.

In one embodiment, the data may be derived programmatically (e.g. by the application), which could for example use information about objects typically associated with the object, or observe which objects are accessed while a user is editing or otherwise accessing the object. This information could be stored in the object's metadata. Any combination of the foregoing may be used. For example, if the user selects from a list identifying the patient as being treated on an outpatient basis for a bacterial infection, the user or the application could then identify objects for the patient's lab report, cell culture, prescriptions, etc. A surgical patient could have objects for diagnostic procedures, surgical supplies used, operating room, x-rays, prescriptions, post-operative report, etc.

Search engines such as the Google Desktop Search Engine (available from Google) may be used to search and index objects as described herein. A default policy could be assigned to each objected, based on user-defined or pre-defined rules. A user interface, such as a "right-click" menu, could be used to enable a user to re-classify the object and assign a different policy. In an embodiment, the classification of the object could also be exposed to a Windows user in the Windows Explorer screen as one of the file's Details. A color coded icon could be displayed with the object to represent the file's IM protection classification. For new files, the user could be asked to specify the IM protection classification level. The classification level may be associated with multiple IM policies, and several classification levels may be available. If IM policies relating to a classification are changed, the new IM policies can be implemented without changing all of the associations between objects and IM policies to be applied to them. If a user requests a classification that the user is not authorized to request, it may be overridden and the system-determined classification used instead.

Figure 12:
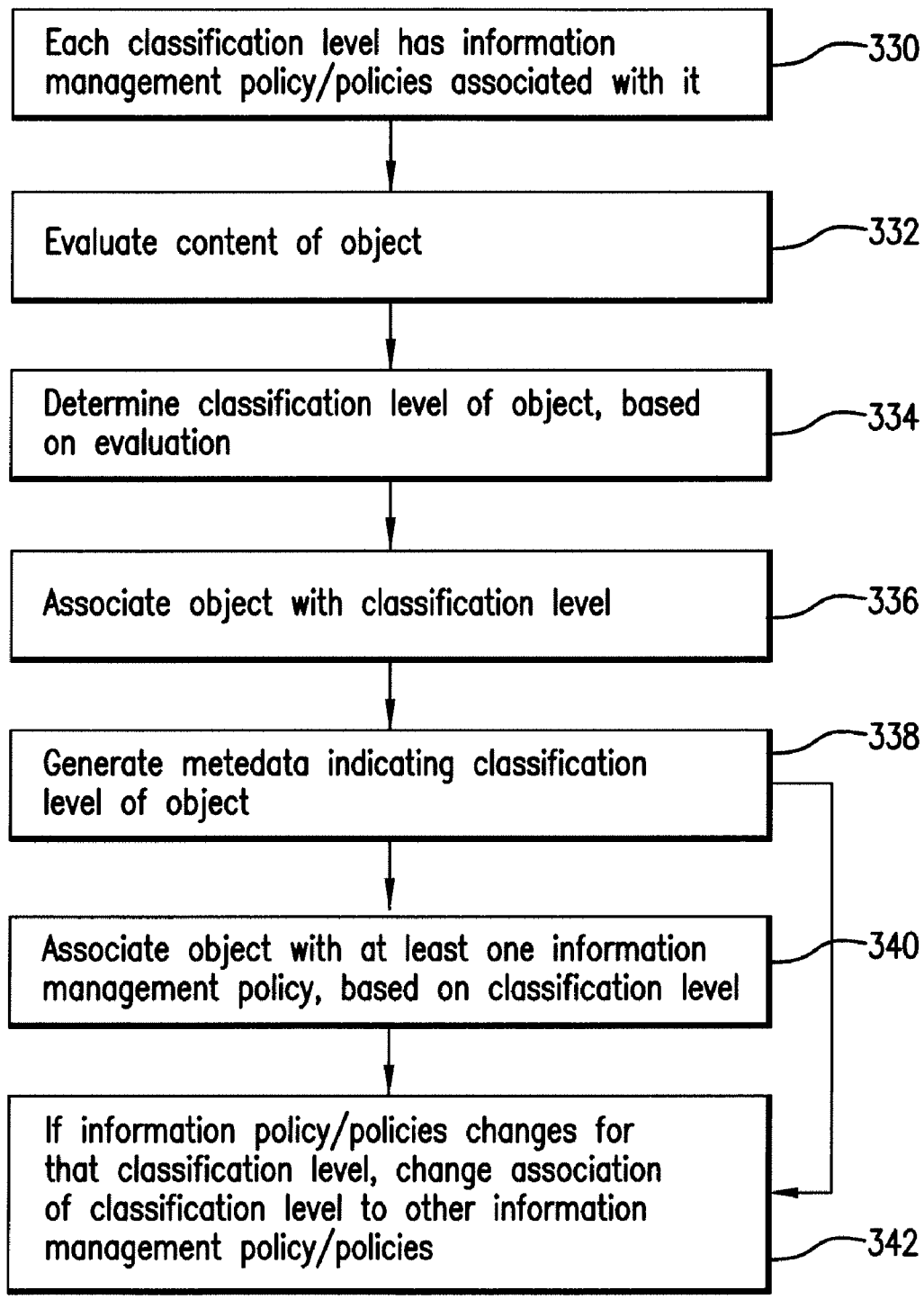
FIG. 12 is a flowchart illustrating the use of classification levels.

An embodiment of the process flow is illustrated in FIG. 12. Each classification level has information management policies associated with it, step 330. In step 332, the content of an object is evaluated, and its classification level is determined in step 334. The object is associated with the classification level, step 336, and metadata are generated indicating the classification level of the object, step 338. The object may be associated with at least one information management policy relating to the classification level, step 340. If the information management policy or policies changes for that classification level, the association of the classification level with information management policies can be changed to the new policies, step 342. This allows application of new information management policies without having to change each individual object.

An authorization system could be used to limit the level of service to which a user has access. For example, a software developer might be able to classify his/her files as "Protected" or "Unprotected", while a senior vice president might have a full range of policy options such as "Protected", "Unprotected", and "Maximum Protection".

Figure 6:
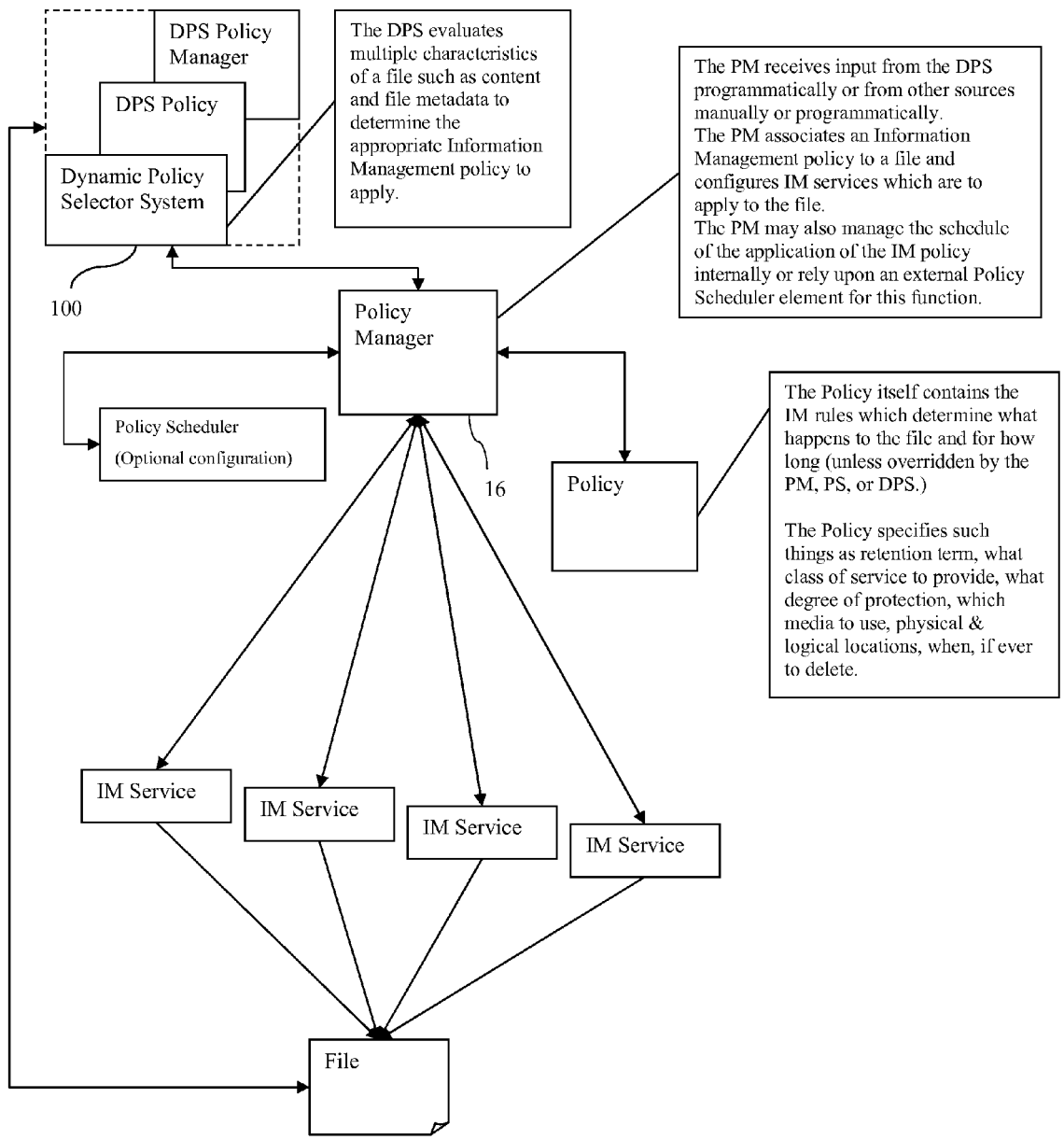
FIG. 6 is a diagram of a dynamic policy selector with a policy manager and policy scheduler.

In one embodiment, illustrated in FIG. 6, a dynamic policy selector (DPS) 100 may be configured with a set of DPS policies that direct its actions. A DPS policy could specify an action such as:

Inspect each file from User A. If the file contains 'Explosion' use IM Retention Policy 5 and IM Class of Service Policy 1.

Another DPS policy might be:

Look at each file with IM Retention Policy 5 associated to it.

If the file is from User A and has not been touched in 6 months, apply IM Class of Service Policy 2.

The DPS 100 may thus have a set of analytic policies and act as a policy manager/scheduler, as shown in FIG. 6. The DPS 100 performs the actions (inspection, analytics or activating other analytic engines, etc.), the DPS policies specify what actions the DPS should take (such as "look for the word 'explosion' in files last used no earlier than January 2004"), and the DPS policy manager/scheduler tells the DPS 100 which DPS policies to use and when (such as "inspect all of User A's files every day using the Security policy"). The DPS policies may be chained; i.e. one DPS policy may be used to invoke another DPS policy. Several DPS policies may be applied in order to trigger an IM policy or policies to be applied to the object or objects.

The DPS 100 may thus be used to generate metadata that may be used to drive the IM system.

For example, an object may be determined to contain patient health care data (based on the DPS analysis of the object) and thus subject to HIPAA (Health Insurance Portability and Accountability Act) regulations requiring a 6-year retention span. The actual determination of which IM policy or policies to apply and their duration may be done by the DPS 100. In this example, the DPS 100 applies a DPS-HIPAA policy. The DPS-HIPAA policy specifies what constitutes a HIPAA file (e.g. keywords, x-ray images, etc.). The DPS's HIPAA policy also specifies that files meeting the criteria must have a retention policy of 6 years.

In one embodiment, the DPS 100 can have knowledge of the appropriate IM policies of the IM system. In one embodiment, the DPS 100 may be separate from the IM system and have no knowledge of IM policies. The DPS 100 may be configured to simply pass the desired retention period requirement to the IM Policy Manager 16 which would in turn select the appropriate IM policy to meet the requirement. This facilitates the use of different IM systems with a content analysis system that uses a DPS, as the DPS would not need to know the details of how the IM systems would implement policies.

The DPS 100 may use the IM Policy Manager 16, which keeps the associations of the IM policies to the relevant object. The IM Policy Manager 16 may be invoked and controlled manually or programmatically (such as by the DPS 100). In one embodiment, the IM Policy Manager 16 does not determine which policies are to apply, nor does it set the duration directly. The IM Policy Manager 16 can break or revoke associations between policies and the objects to which they are associated. The DPS 100 may also be configured to disassociate or terminate policy and object relationships by issuing a command to the IM Policy Manager 16 to terminate a policy.

Once an IM policy or policies are selected, they are applied to the object for the term as specified by the DPS policy or policies and required by the DPS 100. Termination and/or changes of the application of the IM policies can also be done by the IM policies themselves (which may be self-limiting), by the IM Policy Manager 16, or by the DPS 100.

Figure 5:
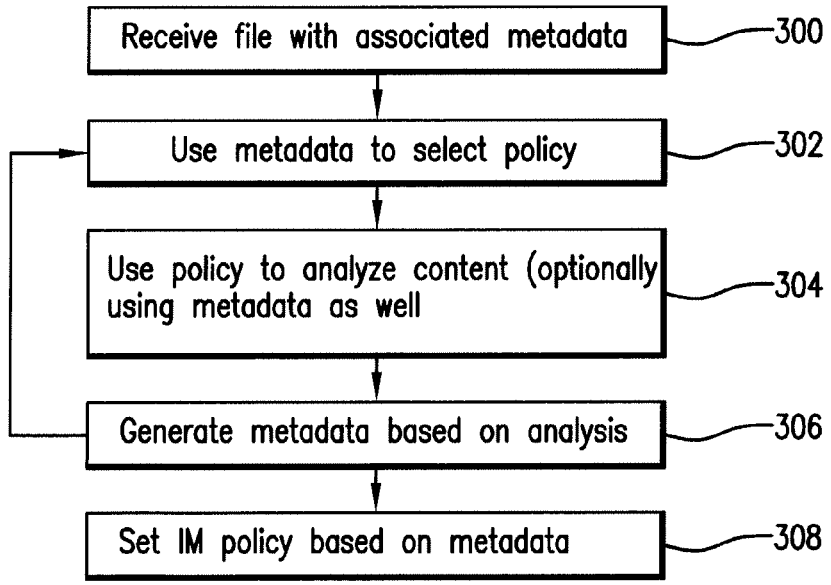
FIG. 5 is a flowchart illustrating processing of objects using a dynamic policy selector.
Figure 11:
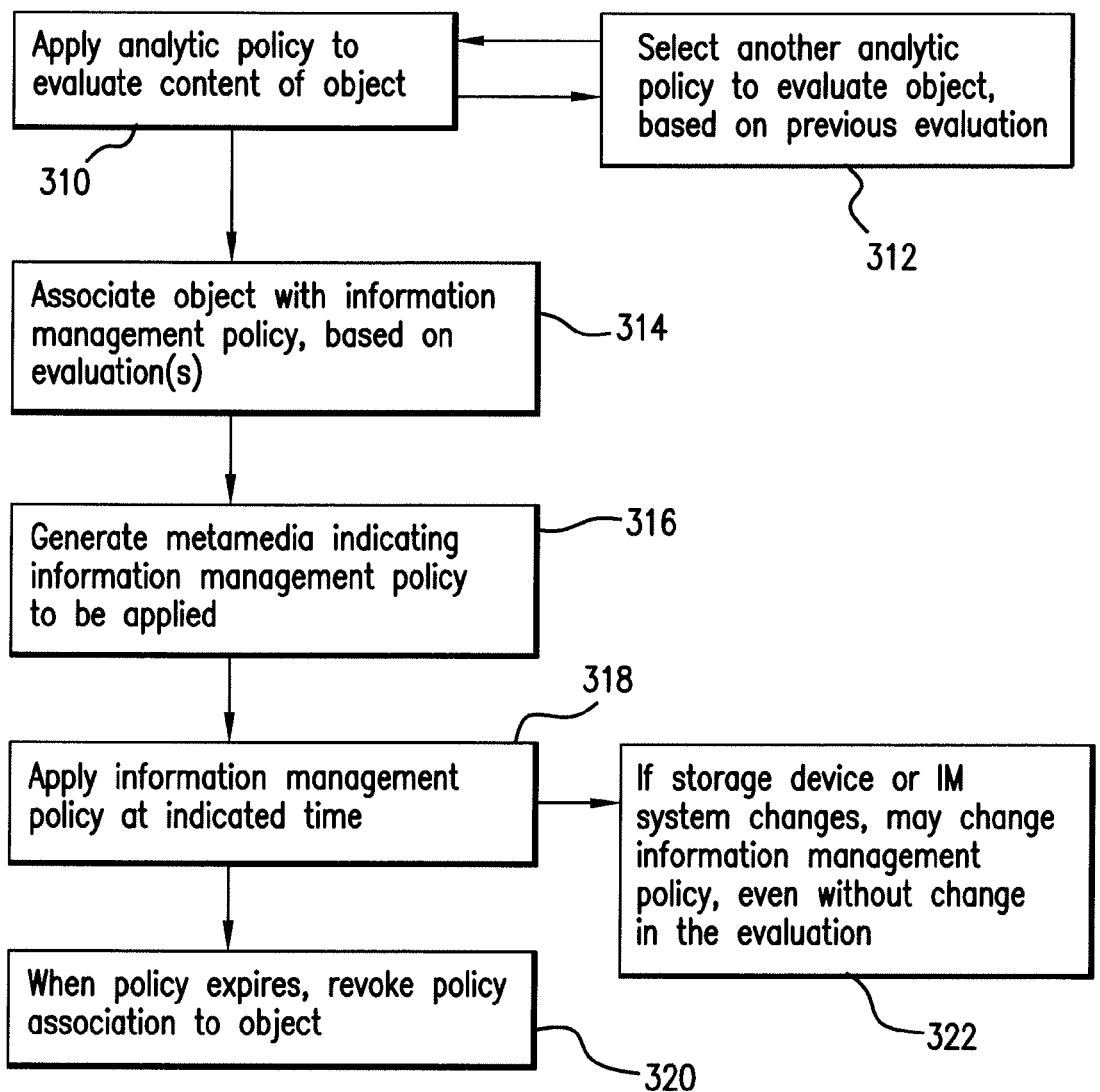
FIG. 11 is a flowchart illustrating the use of policies.

FIG. 5 and FIG. 11 illustrate embodiments of process flows for the use of policies in information management. Referring to FIG. 5, for example, in step 300 a file with associated metadata is received. This metadata is used to select an analytic policy, step 302. In step 304, the policy is used to analyze content, and metadata may be used as well. Metadata may be generated based on the analysis, step 306. This metadata may be used to select another analytic policy, returning to step 302, or to set an information management policy, step 308. In FIG. 11, an analytic policy is used to evaluate the content of the object, step 310. In step 312, another analytic policy may be used to evaluate the object, based on the results of the previous evaluation. The object is associated with an information management policy, based on the evaluation(s), step 314, and metadata are generated indicating the information management policy to be applied, step 316. In step 318, the information management policy is applied at the indicated time, and when/if the policy expires, the policy association to the object is revoked, step 320. If there is a change to the information management system, storage device, or other change (such as deciding that in order to comply with the 6-year retention requirement, data will be sent to a content-addressable storage instead of tape), the information management policy may be changed, step 322.

Efficient information lifecycle management generally benefits from object-by-object implementation of protection policies as described herein. Typically, information protection technologies such as backup, archive, and replication are not designed to target a single file or object. They may not track information about the file, its need for protection, replication, archival, or deletion. Because of this, the processes are conducted at either the block level or file level without regard to an individual file's information management needs. This may create problems, for example, when trying to apply one protection policy to one file, while applying a different policy to the file next to it in the same directory. In an efficient implementation, each object receives the protection that it should receive, rather than being grouped with other objects that may not have the same level of protection.

Figure 7A:
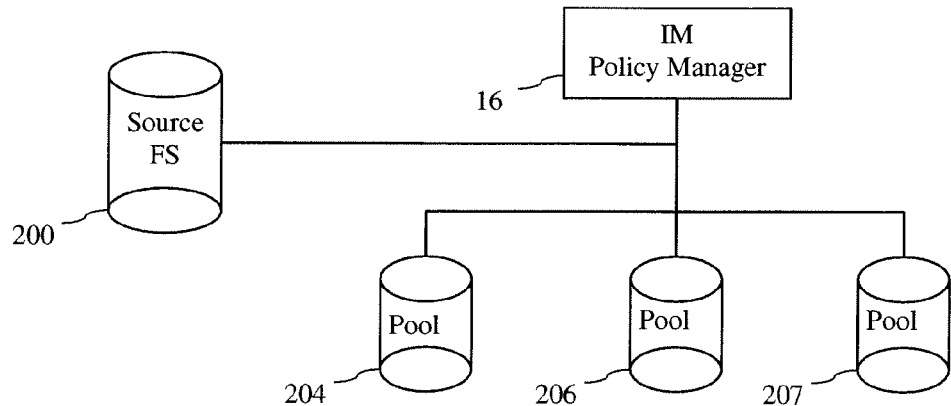
FIGS. 7A and 7B are diagrams illustrating embodiments of a storage pool.
Figure 7B:
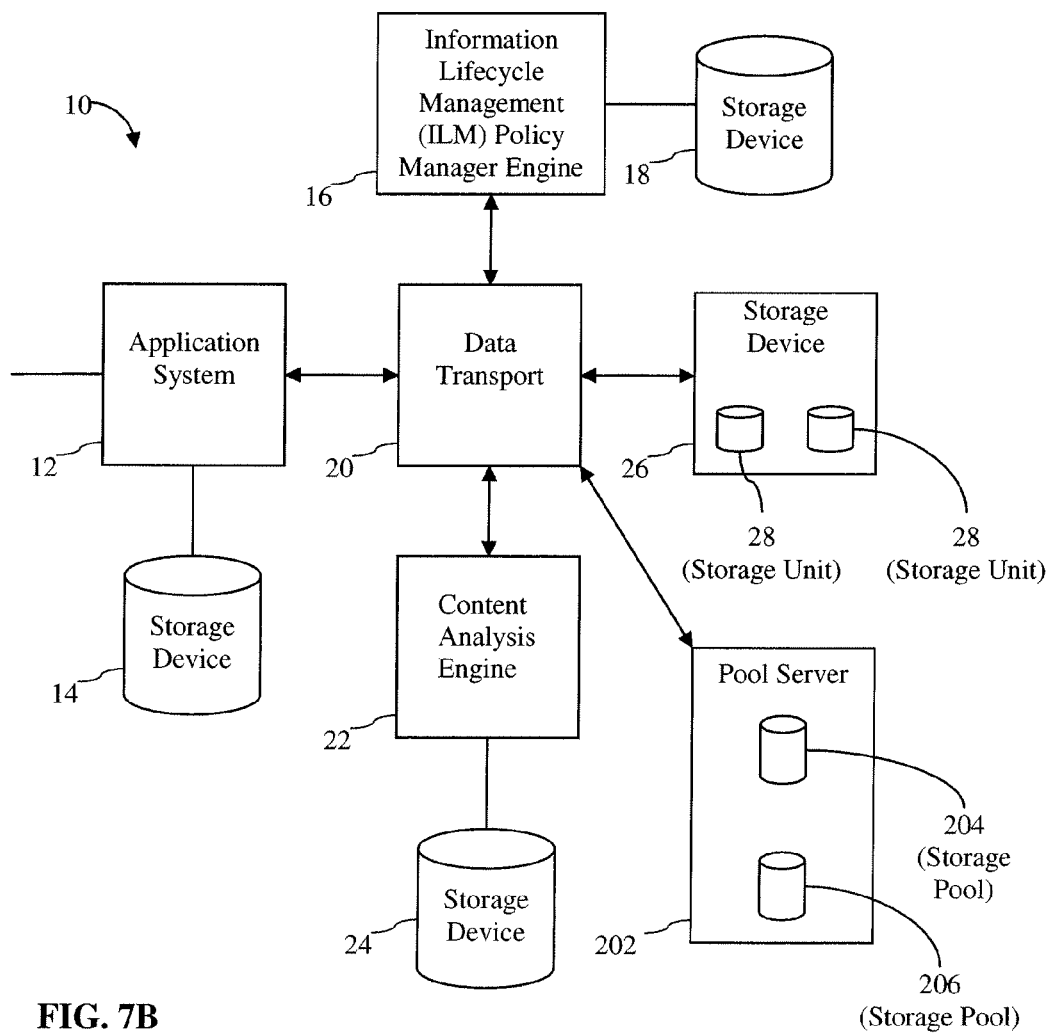

In one embodiment, an ILM system may be created based on centralized storage pools, each of which provides a specific class of information protection service. By way of example, a storage pool will be described as providing a specific class of information protection service, but it should be understood that a pool may support more than one specific class of information protection service. Further, "centralized" may be understood to refer to the logical or physical grouping of similarly-classified files/objects together, rather than a physical arrangement of storage devices, which may be placed in the same location or in different locations (such as a facility thousands of miles away). An embodiment is shown in FIG. 7A. Source filesystem 200 communicates with IM Policy Manager 16, which assigns objects from filesystem 200 to various pools 204, 206, and 207, based on the IM policy or policies associated with each object (or group of objects if an information group has been defined as described herein). FIG. 7B is similar to FIG. 1 with the addition of pool server 202 comprising storage pools 204 and 206, for example.

Figure 8:
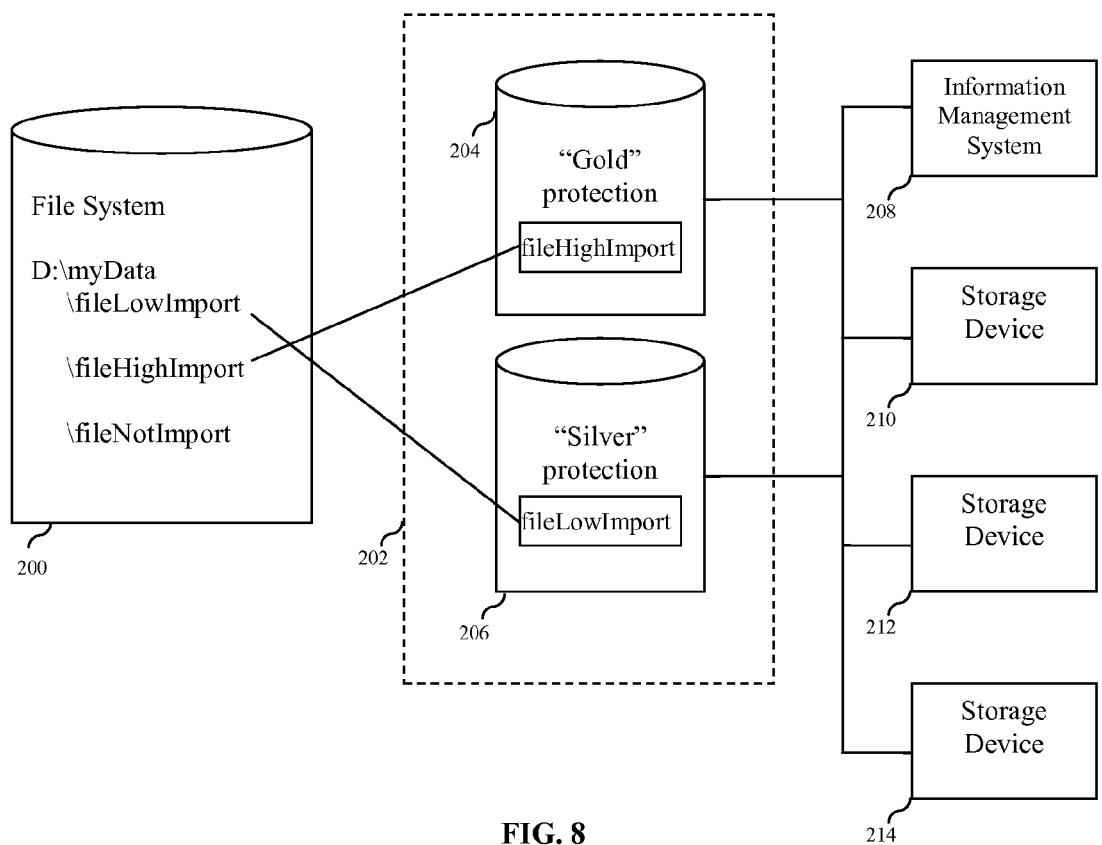
FIG. 8 illustrates the association of objects with storage pools.

A storage pool may provide a particular class of information protection service, such as backups nightly, while another may be replicated, archived, and receive snapshot backups every hour. Still another could be replicated, archived, and receive continuous data protection. An embodiment is illustrated in FIG. 8. Filesystem 200 contains files (which may have unstructured data) that have been analyzed to determine their appropriate classification. This filesystem 200 could correspond to storage system 26 or be some other storage system. Files are classified and associated with a protection classification level appropriate to their classification. As described herein, a classification level may be associated with several IM policies to provide the desired level of service, protection, availability, etc. Some files are determined to be of High Importance, and are associated with storage pool 204 in pool server 202. Other files are determined to be of Low Importance, and are associated with storage pool 206 in pool server 202. Still others are determined to be Not Important, and have not been associated with any storage pool. These files will receive whatever backup the local filesystem gets, which may be a simple Windows Backup or none at all.

The pools 204 and 206 are in communication with an information management system 208 (which may, for example, be a backup or replication server), and storage devices 210, 212, and 214 (which may, for example, be disk drives, content addressable storage, flash memory, tape drives, optical drives, CD-Recordable drives, DVD-Recordable drives, non-volatile storage, etc.). The information management system 208 may be configured to provide different classification levels (of protection, service, availability, mirroring, etc.) to pools 204 and 206. For example, IM system 208 may be configured to perform a snapshot backup of pool 204 every hour, while performing a backup of pool 206 nightly.

It should be understood that the embodiment of FIG. 8 is intended to be illustrative and not in any way limiting with regard to the specific configuration disclosed. For example, other network topologies may be used, with storage devices in a SAN, iSCSI, or Fibre Channel configuration. Any number or type of information management systems and storage devices may be used.

Figure 9:
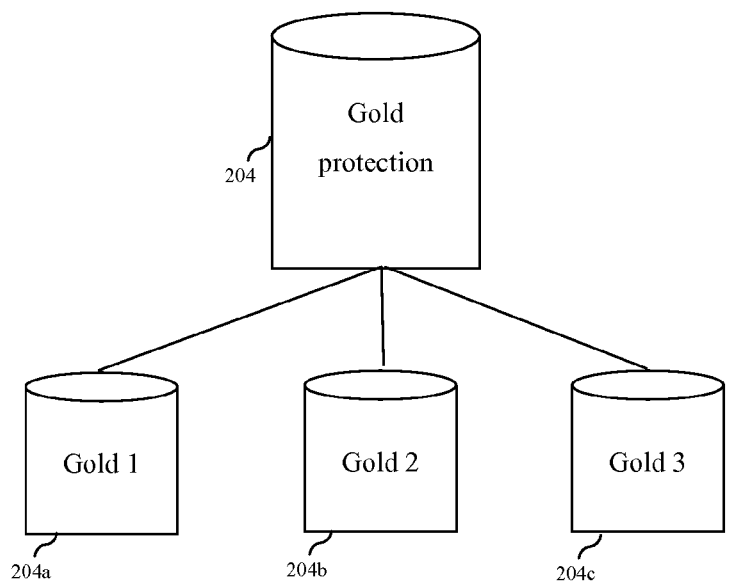
FIG. 9 illustrates an embodiment of sub-pools.

A pool may be subdivided into sub-pools as well. The sub-pools would inherit the protection policies of their parents, while adding their own protection policies. Thus, a pool might be replicated to certain locations, and every member of that pool would be replicated to those locations. Within the pool, one sub-pool might receive snapshot backups every hour, while another sub-pool might be backed up nightly. Referring to FIG. 9, a pool 204 receiving "Gold" protection could be subdivided into sub-pools 204a, 204b, and 204c, receiving Gold 1, Gold 2, and Gold 3 protection, respectively. "Gold" protection could involve replication to a secure underground facility, which all three sub-pools 204a-c would receive. Gold 1 protection might specify nightly backups, Gold 2 might specify hourly snapshot backups, and Gold 3 might specify continuous data protection. Storage devices to which replication, backup, mirroring, etc. occurs may be local, or remotely located at a different facility.

Storage pools could be on a user's local filesystem, such as source filesystem 200 or a filesystem associated with the application system 12, or accessed remotely on another storage system such as pool server 202. The storage pools need not be physically separate from source filesystem 200. In an embodiment, the system could leverage an ILM "filter driver" running on the source file server (the file server on which an object is first placed or created by the user or application). This driver could replace an object with a shortcut, stub, Windows reparse point, symbolic link, or some form of link. Based on the object's value to the user or business (which may be determined as has been described herein), the driver would move the underlying object to the appropriate storage pool, where it would receive the appropriate level of protection. Once an object has been moved to a pool, all of its I/O would take place on the "pool" copy of the object, using the shortcut, stub, reparse point, or other link to the pool copy, and would be transparent to the user. This may also free up space on the local filesystem for data that does not require protection using the ILM system, where the storage pools are on a different storage device(s) from the local filesystem. It should be understood that as used herein, "replace" does not necessarily mean to place the replacement in the same precise location as the original, but to effect the replacement in such a way that an attempt to access the original will result in an access to the replacement.

Figure 13:
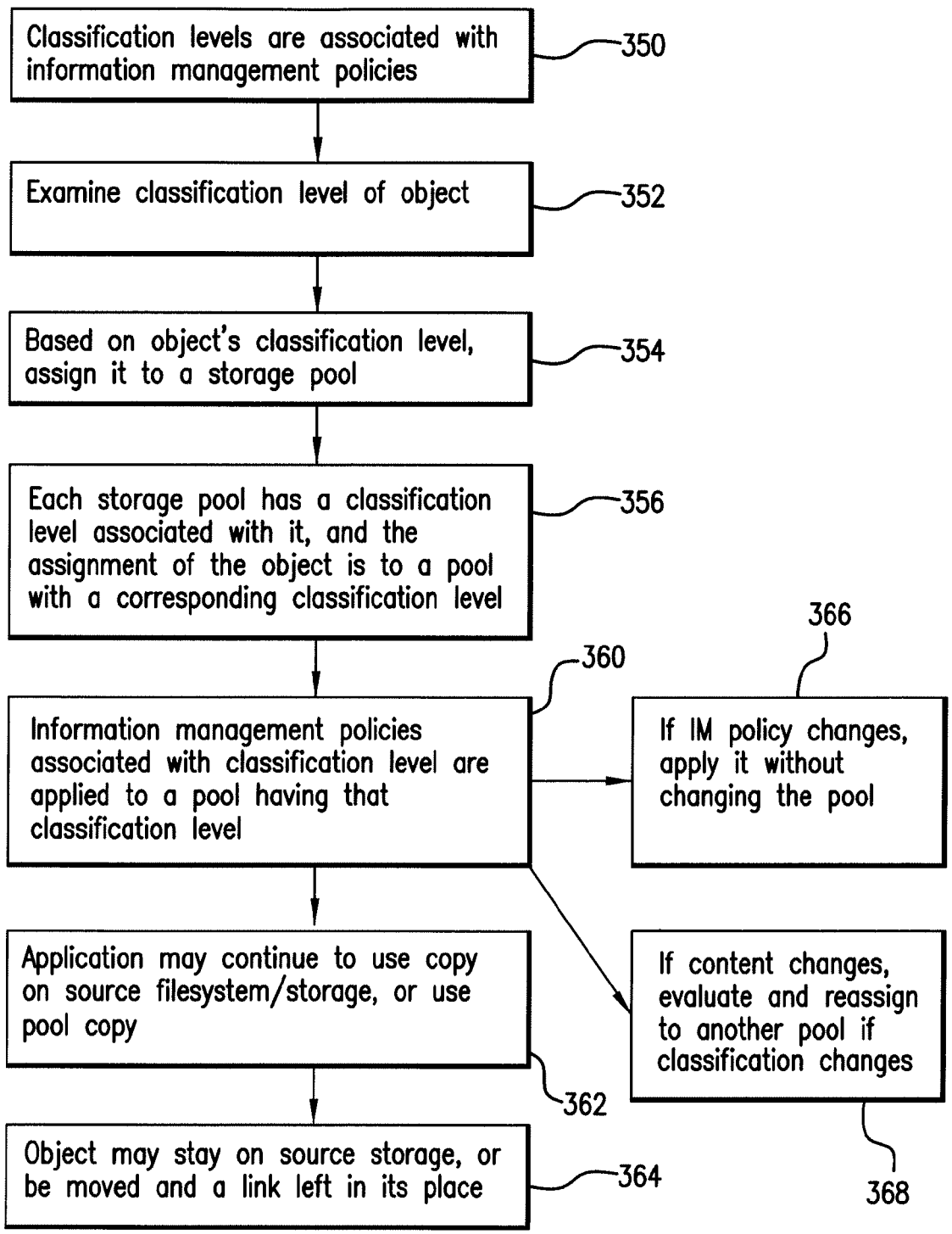
FIG. 13 is a flowchart illustrating the use of storage pools.

FIG. 13 illustrates an embodiment of the process flow. Classification levels are associated with information management policies, step 350. In step 352, an object is examined to determine its classification level, and is assigned to a storage pool based on its classification level, in step 354. As indicated in step 356, each storage pool may have a classification level associated with it, and the object is assigned to a pool with a corresponding classification level. Information management policies associated with a classification level are applied to a storage pool having that classification level, step 360. If information management policies associated with a classification level change, they can be applied without changing the pool having that classification level, step 366. If the content of an object changes, it may be evaluated and assigned to another pool if its classification changes, step 368. In step 362, applications may continue to use the copy of the object on the source storage/file system, if a copy is kept locally, or use the pool copy. The object may be kept on the source storage, or be moved and a link left in its place, step 364, as described herein.

Metadata about the object, such as applicable ILM policies, could be stored in the object itself using a variety of approaches. For example, on Windows the metadata could be stored as a separate file stream, or as part of the reparse point. Metadata could also be stored separately and the object linked to the metadata through pointers, indexes, or some other kinds of links.

In one embodiment, the original object may remain on the local file server, while a protected copy is maintained on a pool server, which may be characterized as a backup with "pools" of objects that have common expiration dates, common information protection/availability/replication/mirroring policies, etc. In this manner, a mobile user could still have his files (objects) local, but copies could be maintained and protected on the ILM storage server (the pool server). Metadata about the object itself could be stored with the object, as described above.

Figure 10:
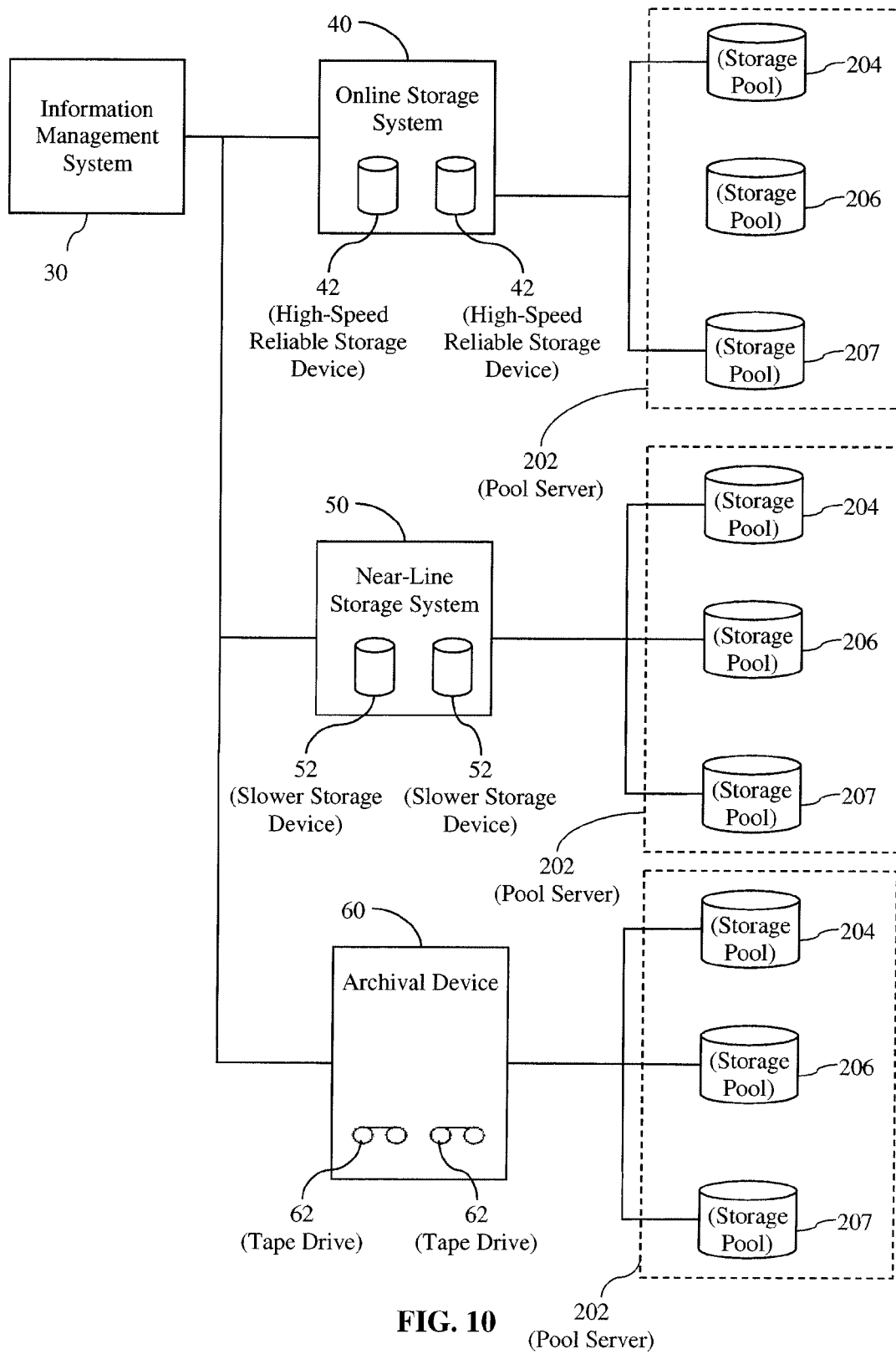
FIG. 10 illustrates an embodiment of pools with a hierarchical storage management system.

In one embodiment, the object may be moved into a content management repository such as Documentum, available from EMC Corporation. The content management repository may store the object in a directory that receives the appropriate level of protection, which may be associated with a storage pool or pools. FIG. 10 illustrates an embodiment, in which various levels of an HSM system are associated with pool servers 202 comprising storage pools 204, 206, and 207. Other content analysis may take place, in order to determine to which pool an object should be assigned, and may be performed and IM policies implemented by a content analysis engine, IM policy manager, etc. (not shown) in accordance with the principles described herein.

Although the methods and systems herein have been described with respect to an illustrative embodiment, it should be appreciated that the methods and systems disclosed are independent of the precise architecture of the information management system, dynamic policy selector, content analysis engine, storage system, etc. used for processing data. Functions and capabilities may be distributed among various systems in a variety of ways, and the principles of the invention are independent of the exact tasks performed by each system. They are applicable to tape storage, optical devices, hard disk drives, and all other types of data storage.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method of managing an object stored in an information management system, the method comprising:
   retrieving the object from the information management system; evaluating content of the object to determine a classification level, wherein evaluating the content of the object includes determining a type of the object from metadata associated with the object, using the type of the object to evaluate the content of the object, and finding a selected element in the content of the object, wherein the classification level is determined from the metadata associated with the object;
   associating the object to an information group relating to the classification level, wherein the information group is serviced according to the classification level;
   associating the object to the classification level, wherein the classification level indicates importance of the object;
   associating the classification level with an information management policy based on the importance of the object, wherein the information management policy manages a lifecycle of the object, wherein the information management policy includes an action to be performed relating to the object, wherein the information management policy indicates at least one parameter selected from the group comprising performance, latency, bandwidth, security, availability, backup frequency, level of encryption, number of copies, compression, media type, data migration, retention period, or access control, wherein the lifecycle of the object includes at least one from the group of quarantine, protection level, workflow management, service level, security, availability, and provisioning;
   updating metadata for the object, wherein the updated metadata includes the classification level;
   storing the updated metadata for the object in the information management system;
   performing the action using the at least one parameter to perform the action on the object; and
   changing the association of the classification level from the information management policy to a second information management policy, without changing the association of the object with the classification level of the object stored in the updated metadata associated with the object.

2. The method as recited in claim 1, further comprising determining an authorization level for the classification level from the updated metadata associated with the classification level.

3. The method as recited in claim 2, further comprising overriding the classification level based on the authorization level.

4. The method as recited in claim 1, further comprising displaying to a user the classification level of the object.

5. The method as recited in claim 4, further comprising providing to the user an interface for changing the classification level of the object.

6. The method as recited in claim 5, further comprising determining an authorization level of the user.

7. The method as recited in claim 6, further comprising overriding a requested classification level based on the user authorization level.

8. An information management system for managing an object, comprising:
   a memory;
   a processor configured to:
   retrieving the object from the information management system;
   evaluate content of the object to determine a classification level, wherein evaluating the content of the object includes determining a type of the object from metadata associated with the object, using the type of the object to evaluate the content of the object, and finding a selected element in the content of the object, wherein the classification level is determined from the metadata associated with the object;
   associate the object to an information group relating to the classification level, wherein the information group is serviced according to the classification level;
   associate the object to the classification level, wherein the classification level indicates importance of the object;
   associate the classification level with an information management policy based on the importance of the object, wherein the information management policy manages a lifecycle of the object, wherein the information management policy includes an action to be performed relating to the object, wherein the information management policy indicates at least one parameter selected from the group comprising performance, latency, bandwidth, security, availability, backup frequency, level of encryption, number of copies, compression, media type, data migration, retention period, or access control, wherein the lifecycle of the object includes at least one from the group of quarantine, protection level, workflow management, service level, security, availability, and provisioning;

update metadata for the object, wherein the updated metadata includes the classification level;

store the updated metadata for the object in the information management system;

perform the action using the at least one parameter to perform the action on the object; and change the association of the classification level from the information management policy to a second information management policy, without changing the association of the object with the classification level of the object stored in the updated metadata associated with the object.

9. A computer program product for managing an object stored in information management system, comprising a non-transitory computer readable storage medium having machine readable code embodied therein for:

retrieving the object from the information management system;

evaluating content of the object to determine a classification level, wherein evaluating the content of the object includes determining a type of the object from metadata associated with the object, using the type of the object to evaluate the content of the object, and finding a selected element in the content of the object, wherein the classification level is determined from the metadata associated with the object;

associating the object to an information group relating to the classification level, wherein the information group is serviced according to the classification level;

associating the object to the classification level, wherein the classification level indicates importance of the object;

associating the classification level with an information management policy based on the importance of the object, wherein the information management policy manages a lifecycle of the object, wherein the information management policy includes an action to be performed relating to the object, wherein the information management policy indicates at least one parameter selected from the group comprising performance, latency, bandwidth, security, availability, backup frequency, level of encryption, number of copies, compression, media type, data migration, retention period, or access control, wherein the lifecycle of the object includes at least one from the group of quarantine, protection level, workflow management, service level, security, availability, and provisioning;

updating metadata for the object, wherein the updated metadata includes the classification level;

storing the updated metadata for the object in the information management system;

performing the action using the at least one parameter to perform the action on the object; and changing the association of the classification level from the information management policy to a second information management policy, without changing the association of the object with the classification level of the object stored in the updated metadata associated with the object.

* * * * *